United States Patent [19]

Gjertsen et al.

[11] Patent Number: 4,671,924
[45] Date of Patent: Jun. 9, 1987

[54] HOLD-DOWN DEVICE OF FUEL ASSEMBLY TOP NOZZLE EMPLOYING LEAF SPRINGS

[75] Inventors: Robert K. Gjertsen, Monroeville Boro; John F. Wilson, Murrysville, both of Pa.

[73] Assignee: Westinghouse Electric Corp., Pittsburgh, Pa.

[21] Appl. No.: 729,607

[22] Filed: May 2, 1985

[51] Int. Cl.⁴ .................................................. G21C 3/32
[52] U.S. Cl. ................................ 376/285; 376/364; 376/434; 376/446
[58] Field of Search ................. 376/285, 364, 434, 446

[56] References Cited

U.S. PATENT DOCUMENTS

| Re. 31,583 | 5/1984 | Klumb et al. |
|---|---|---|
| 3,475,273 | 10/1969 | Krawiec . |
| 3,689,358 | 9/1972 | Smith et al. . |
| 3,770,583 | 11/1973 | Klumb et al. . |
| 3,801,453 | 4/1974 | Jones ................................ 376/446 |
| 4,072,564 | 2/1978 | Jabsen . |
| 4,192,716 | 3/1980 | Anthony . |
| 4,420,457 | 12/1983 | Le Pargoneux . |
| 4,427,624 | 1/1984 | Marlatt et al. ..................... 376/446 |

FOREIGN PATENT DOCUMENTS

| 84480 | 7/1983 | European Pat. Off. ............ 376/364 |
|---|---|---|
| 123607 | 10/1984 | European Pat. Off. ............ 376/364 |

OTHER PUBLICATIONS

Nuclear Energy, 1980, vol. 19, Oct., No. 5, 335-346.

*Primary Examiner*—Deborah L. Kyle
*Assistant Examiner*—Richard W. Wendtland

[57] ABSTRACT

An improved top nozzle includes leaf spring assemblies interposed between its movable upper hold-down plate and stationary lower adapter plate and arranged along respective peripheries thereof. The leaf spring assemblies bias the upper hold-down plate in an upward direction into contact with the upper core plate of the reactor and thereby impose a hold-down force on the fuel assembly via the lower adapter plate. In the preferred embodiment, each leaf spring assembly includes opposite lower and upper ends, with the lower end being attached to the lower adapter plate adjacent one of the corners on its periphery and the upper end being movably coupled in a groove on the upper hold-down plate adjacent a next one of the corners on its periphery. The leaf spring assemblies are arranged in a single file about the peripheries of the lower adapter plate and upper hold-down plate, with one assembly extending between each pair of succeeding corners on the respective peripheries of the lower and uper plates. In an alternative embodiment, a pair of leaf spring assemblies are interposed between the peripheries of the upper and lower plates. Each leaf spring assembly is generally L-shaped and includes opposite spaced apart upper ends and a lower end located between upper ends, with the lower end being attached to the lower adapter plate periphery adjacent one corner of an opposite pair of the corners thereof and the upper ends being movably coupled in grooves defined on the upper hold-down plate periphery adjacent both corners thereon being located on either side of the one corner on the adapter plate periphery.

13 Claims, 13 Drawing Figures

HOLD-DOWN DEVICE OF FUEL ASSEMBLY TOP NOZZLE EMPLOYING LEAF SPRINGS

BACKGROUND OF THE INVENTION

1. Field of the Invention

The present invention relates generally to fuel assemblies for nuclear reactors and, more particularly, is concerned with an improved top nozzle for a fuel assembly in which the coil springs of the hold-down device are advantageously replaced by a unique arrangement of leaf springs.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of helical coil springs surrounding the guide thimbles, such as seen in U.S. Pat. Nos. 3,770,583 (Re. 31,583) and 3,814,667 to Klumb et al.

Specifically, the fuel assembly of Klumb et al includes a top nozzle having an upper hold-down plate, a lower adapter plate (called an upper end plate in the patent) and a plurality of coil springs disposed between the upper and lower plates and coaxially about alignment posts which serve as upper extensions of the guide thimbles (called guide tubes in the patent). The alignment posts extend through the upper hold-down plate and are joined to the lower adapter plate and to the upper ends of the guide thimbles with fastener nuts located on the underside of the lower adapter plate. The upper hold-down plate is slidably mounted on the alignment posts and, as mentioned above, the coil springs are interposed, in compression, between the upper hold-down and lower adapter plates. A radially enlarged shoulder on the upper end of each of the alignment posts retains the hold-down plate on the posts.

The use of coil springs in the Klumb et al type top nozzle to supply the necessary hold-down force to resist upward lifting of the fuel assembly and accommodate thermal growth of the assembly presents several inherent problems.

First, coil springs inherently require considerable axial height even in applications where the required hold-down force is small. The extra amount of height required for the hold-down springs reduces the length of the fuel rods which can be used in the fuel assembly. The failure to maximize the length of the active core, as determined by fuel rod length, results in increased fuel cycle cost, increased KW per foot and increased peaking factors.

Second, coil springs are subject to coolant flow induced vibration. Cross-flow from adjacent fuel assemblies occurs because of the radial flow maldistribution across pressurized water reactor cores which is caused by core inlet flow maldistribution and by temperature differences across the core. Thus, there is a radial pressure gradient at the fuel assembly outlet which induces cross-flow above the fuel rods of the assembly. The coil hold-down springs in the Klumb et al type top nozzle are exposed to the cross-flow which has led to spring failure due to fatigue caused by flow induced vibration.

Consequently, a need exists for a different approach to the provision of adequate hold-down force in a fuel assembly top nozzle of the type disclosed in the Klumb et al patents, one with the objective of eliminating the aforementioned problems of suboptimal active core height and hold-down spring fatigue but requiring minimal modification of the overall top nozzle structure.

SUMMARY OF THE INVENTION

The present invention provides an improved top nozzle arrangement designed to satisfy the aforementioned needs. Specifically, the improved top nozzle of the present invention incorporates leaf springs instead of coil springs to provide the necessary hold-down force to prevent lifting of the fuel assembly and accommodate thermal expansion of the assembly. Contrary to the teachings of the Klumb et al patent (U.S. Pat. No. Re. 31,583), wherein leaf springs are characterized as inherently low deflection devices that are generally incapable of providing the necessary hold-down forces over the entire range of gap distances whigh might be encountered between fuel assemblies and the upper core plate given the spring size limitations dictated by the reactor core environment, the discovery underlying the present invention is that leaf springs applied in unique arrangements thereof can avoid the problems inherent in the use of coil springs.

Particularly, coil springs inherently require more axial height than leaf springs and coil springs suffer from flow induced vibration whereas leaf springs do not. The amount of vertical height saved by the use of a leaf spring compared to a coil spring depends upon the fuel assembly hold-down force requirement. For a coil spring with a given deflection range, a low force requirement can be achieved by a small diameter wire with a relatively short spring length, whereas a high force requirement leads to a larger diameter wire which requires a longer spring length to maintain the same deflection range and stresses. Unlike the coil spring, the height of the leaf spring is not porportional to the hold-down force it provides. The leaf spring height is much less sensitive to force requirements; instead merely more leafs are required for larger forces. To illustrate this, the vertical height savings by substituting a leaf spring for a coil spring in a small hold-down force design fuel assembly is about 2 inches, whereas in a high hold-down force fuel assembly the savings is about $4\frac{1}{2}$ inches. To quantify the advantages of a shorter top nozzle, which results from use of leaf springs instead of coil springs and permits a longer active core, an increase of 3 inches in core length results in a fuel cycle cost savings of about 0.5 percent, which is a reduction in KW per foot of 2 percent.

Accordingly, the present invention is directed to improvements in a fuel assembly which includes a top nozzle and a plurality of guide thimbles having upper end portions mounting the top nozzle. The top nozzle has an upper hold-down plate and a lower adapter plate, and the upper end portions of the guide thimbles extend through and stationarily mount the lower adapter plate and extend through and slidably mount the upper hold-down plate for relative movement along the guide thimble upper end portions toward and away from the lower adapter plate. The top nozzle further has means which defines an upper limit of relative movement of the hold-down plate along the guide thimble upper end portions away from the lower adapter plate.

The improvements incorporated by the fuel assembly reside in the top nozzle and comprise a plurality of leaf spring assemblies interposed between the upper hold-down plate and the lower adapter plate so as to yieldably support the movably upper hold-down plate in a spaced relation above the stationary lower adapter plate. The leaf spring assemblies are arranged along opposing peripheries of the upper hold-down plate and the lower adapter plate and engaged with the upper and lower plates at predetermined locations on the respective peripheries thereof so as to bias the upper hold-down plate in an upward direction and thereby impose a hold-down force on the fuel assembly via the lower adapter plate which tends to displace the upper hold-down plate to its upper limit along the guide thimble upper end portions away from the lower adapter plate.

More particularly, the upper hold-down plate and lower adapter plate of the top nozzle each has a plurality of corners on the respective peripheries thereof which are opposite to and vertically aligned with one another. Also, there are two embodiments of leaf spring assembly arrangements in the improved top nozzle.

In a preferred embodiment, each leaf spring assembly includes opposite lower and upper ends. Each leaf spring assembly is attached at its lower end to the lower adapter plate adjacent one of the corners on the adapter plate periphery and is movably coupled at its upper end to the upper hold-down plate adjacent a next one of the corners on the hold-down plate periphery. The upper hold-down plate has a plurality of guide means defined therein adjacent the corners on its periphery within which are movably coupled the respective upper ends of the leaf spring assemblies. The leaf spring assemblies are arranged in a single file about the peripheries of the lower adapter plate and upper hold-down plate such that the upper end of each leaf spring assembly being movably coupled to the guide means adjacent one of the corners of the upper hold-down plate overlies the lower end of the next succeeding leaf spring assembly in the single file thereof which, in turn, is attached adjacent the one corner of the lower adapter plate which is aligned below the one corner of the upper hold-down plate. The single file of leaf spring assemblies includes one leaf spring assembly extending between each pair of succeeding corners in the aligned pluralities thereof on the respective peripheries of the lower adapter plate and upper hold-down plate.

In an alternative embodiment, the improved top nozzle includes a pair of leaf spring assemblies with each leaf spring assembly including opposite spaced apart upper ends and a lower end located between the upper ends. Each leaf spring assembly is attached at its lower end to the lower adapter plate adjacent one corner of an opposite pair of the corners on the adapter plate periphery and is movably coupled at its upper ends to the upper hold-down plate adjacent both corners on the hold-down plate periphery being located on either side of the one corner on the adapter plate.

While each leaf spring assembly in the alternative embodiment has a generally L-shaped configuration compared to the generally linear configuration of the leaf spring assembly in the preferred embodiment, both embodiments of the leaf spring assemblies may include one or more individual leaf springs therein depending upon the particular application.

These and other advantages and attainments of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also, in the following description, it is to be understood that such terms as "forward", "rearward", "left", "right", "upwardly", "downwardly", and the like are words of convenience and are not to be construed as limiting terms.

In General

Figure 1:
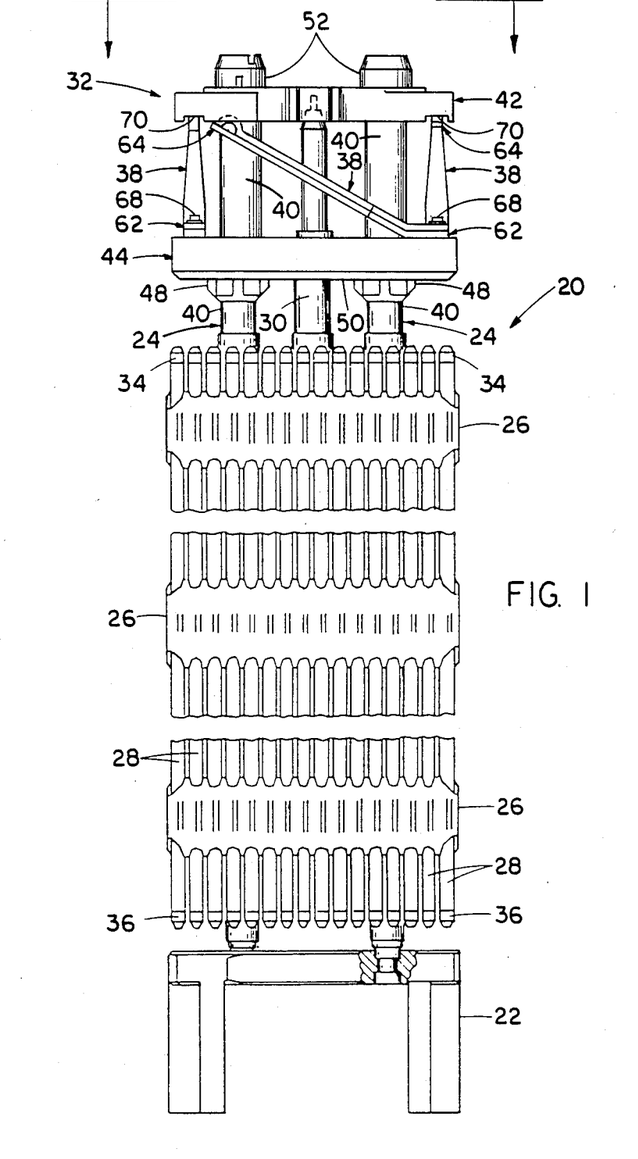
FIG. 1 is an elevational view, with parts broken away for clarity, of a fuel assembly having an improved top nozzle constructed in accordance with the principles of the present invention.

Refering now to the drawings, and particularly to FIG. 1, there is shown an elevational view of a nuclear reactor fuel assembly, represented in vertically foreshortened form and being generally designated by the numeral 20. Basically, the fuel assembly 20 includes a lower end structure or bottom nozzle 22 for supporting the assembly on the lower core plate (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has an instrumentation tube 30 located in the center thereof and an upper end structure or top nozzle 32 attached to the upper ends of the guide thimbles 24 which incorporates certain improvements in accordance with the present invention which will be fully described below. With such an arrangement of parts, the fuel assembly 20 forms an integral unit capable of being conventionally handled without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets (not shown) and is closed at its opposite ends by upper and lower end plugs 34,36. The fuel pellets composed of fissile material are responsible for creating the reactive power of the reactor. A liquid moderator/coolant such as water, or water containing boron, is pumped upwardly through the guide thimbles 24 and along the fuel rods 28 of the fuel assembly 20 in order to extract heat generated therein for the production of useful work.

To control the fission process, a number of control rods (not shown) are reciprocally movable in the guide thimbles 24 located at predetermined positions in the fuel assembly 20. Since the control rods are inserted into the guide thimbles 24 from the top of the fuel assembly 20, the placement of the components forming the improved top nozzle 32 must accommodate the movement of the control rods into the guide thimbles 24 from above the improved top nozzle 32.

Improved Top Nozzle Employing Leaf Springs

Figure 12A:
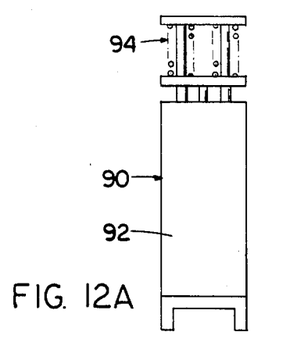
FIGS. 12A and 12B are diagrammatic representations of two fuel assemblies having the same overall axial height, but one incorporating the prior art coil springs and the other the leaf springs of the present invention, wherein the leaf springs allow use of fuel rods of greater height than do the coil springs while still delivering the same hold-down force.
Figure 12B:
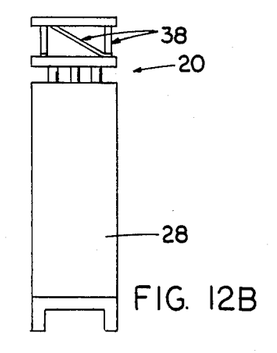

Turning now to FIGS. 1 to 6, there is shown the preferred arrangement of a plurality of leaf spring assemblies 38 employed by the improved top nozzle 32 in accordance with the present invention. The leaf spring assembly arrangement eliminates the problems associated with the prior art coil springs and results in the capability of incorporating longer fuel rods 28 in the fuel assembly 20, as represented in FIG. 12.

Figure 2:
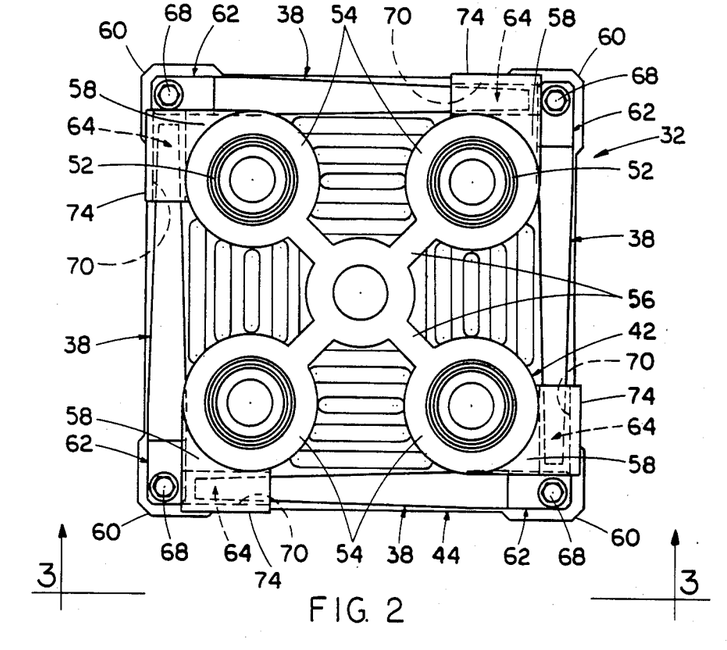
FIG. 2 is an enlarged top plan view of the improved top nozzle as seen along line 2—2 of FIG. 1, showing a preferred arrangement of the leaf springs employed by the top nozzle.
Figure 3:
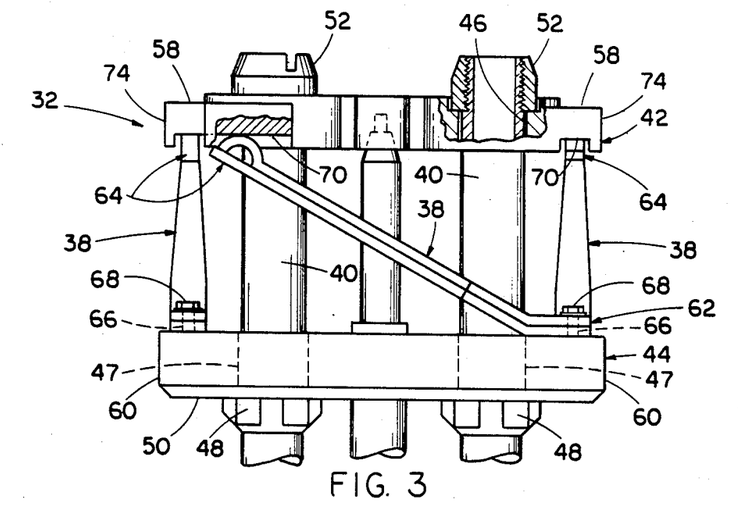
FIG. 3 is an enlarged elevational view, with portions broken away and sectioned, of the improved top nozzle as taken along line 3—3 of FIG. 2.

The top nozzle 32 incorporating the improvements of the present invention is conventionally mounted on the upper end portions 40 of the guide thimbles 24 and includes an upper hold-down plate 42 and a lower adapter plate 44. The upper end portions 40 of the guide thimbles 24, being in the form of alignment posts, extend through a plurality of passageways 46 in the upper hold-down plate 42 and fit through a plurality of openings 47 in the lower adapter plate 44 and are connected thereto with fastener nuts 48 located on the underside 50 of the lower adapter plate. The upper hold-down plate 42 is slidably mounted on the guide thimble upper end portions 40 and radially enlarged nuts 52 are threaded on the upper ends thereof which define an upper limit of relative movement of the hold-down plate along the guide thimble upper end portions away from the lower adapter plate 44. The upper hold-down plate 42 is composed of an array of hubs 54 and ligaments 56 which extend between and interconnect the hubs. Each hub 54 has one of the passageways 46 defined therethrough. In addition, the upper hold-down plate 42 and the lower adapter plate 44 each have a rectangular configuration with a plurality of corners (preferably four in number) 58 and 60 defined on respective peripheries thereof being opposite to and vertically aligned with one another. Therefore, in summary, the upper end portions 40 of the guide thimbles 24 extend through and stationarily mount the lower adapter plate 44, whereas they extend through and slidably mount the upper hold-down plate 42 for relative movement toward and away from the lower adapter plate.

The preferred embodiment of the improvements provided by the present invention relates to the plurality of leaf spring assemblies 38 interposed between the upper hold-down plate 42 and the lower adapter plate 44 in the single file arrangement seen in FIGS. 1 to 3, by which arrangement the movable upper hold-down plate is yieldably supported in a spaced relation above the stationary lower adapter plate. The leaf spring assemblies 38 are arranged along the respective peripheries of the upper hold-down plate 42 and the lower adapter plate 44 and engaged with the upper and lower plates adjacent predetermined ones of their corners 58,60. In such arrangement, the leaf spring assemblies 38 bias the upper hold-down plate in an upward direction toward and into contact with the upper core plate (not shown) and thereby impose a hold-down force on the fuel assembly 20 via the lower adapter plate 44.

As seen in FIG. 3, each leaf spring assembly 38 has a generally linear, inclined configuration and includes opposite lower and upper ends 62,64. The pair of leaf springs composing the assembly 38 illustrated in FIG. 3 merely serve as an example. Some applications may require more than two leaf springs and others only one leaf spring. The lower end 62 of the assembly 38 is bent slightly relative to the remainder thereof and a hole 66 is formed in the lower end 62 to facilitate its attachment by a bolt 68, as seen in FIGS. 2 and 3, to the lower adapter plate 44 adjacent one of the corners 60 on the adapter plate periphery.

Figures 4, 5:
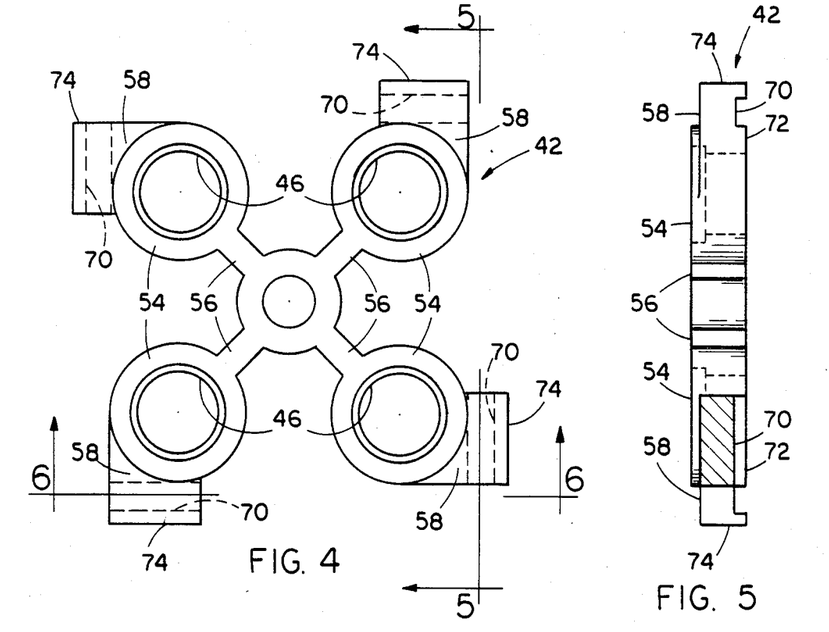
FIG. 4 is a top plan view of the upper hold-down plate removed from the improved top nozzle of FIG. 2.
FIG. 5 is an elevational view, partly sectioned, of the upper hold-down plate as taken along line 5—5 of FIG. 4.
Figure 6:
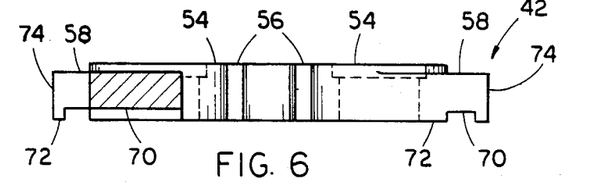
FIG. 6 is another elevational view, partly sectioned, of the upper hold-down plate as taken along line 6—6 of FIG. 4.

For coupling with the upper end 64 of each assembly 38, the upper hold-down plate 42 has a plurality of guide means defined therein adjacent its peripheral corners 58. Each guide means is in the form of a groove 70 defined on the underside 72 of a flange 74 formed on the upper hold-down plate 42 adjacent the respective corners 58 thereof. The upper end 64 of the assembly 38 has a semi-cylindrical cross-sectional configuration and fits within the groove 70 so as to movably couple the assembly 38 to the upper hold-down plate 42.

Due to the inclined configuration of the leaf spring assembly 38, the upper end 64 of each assembly is coupled to the upper plate 42 adjacent the next succeeding one of the corners 58 on the periphery thereof after the one of its corners 58 aligned above the one corner 60 of the adapter plate 44 adjacent to which the lower end 62 of the assembly 38 is attached. Thus, in the single file arrangement of the preferred embodiment of the leaf spring assemblies 38, each assembly 38 extends along one side of the four-sided, generally rectangular upper and lower plates 42,44 between each pair of succeeding corners 58,60 in the aligned pluralities thereof on the respective peripheries of the upper and lower plates.

Turning now to FIGS. 7 to 11, there is shown an alternative embodiment of the leaf spring assemblies. In the alternative arrangement, a pair of leaf spring assemblies 76 are interposed between the upper hold-down plate 42 and the lower adapter plate 44 so as to yieldably support the movable upper hold-down plate above the stationary lower adapter plate. Like before, the leaf spring assemblies 76 are arranged along the respective peripheries of the upper hold-down plate 42 and the lower adapter plate 44 and engaged with the upper and lower plates adjacent predetermined ones of peripheral corners 58,60 thereon. Due to its L-shaped configuration, each leaf spring assembly 76 is coextensive with two adjacent sides of the four-sided, generally rectangular upper and lower plates 42,44.

Here also, the upper hold-down plate 42 has guide means defined therein adjacent predetermined ones of its corners 58. This time the guide means takes the form of a groove 78 defined in the underside of a flange 80 on each of a pair of diagonally opposite pair of the corners 58. In view of its generally L-shaped configuration, each leaf spring assembly 76 includes a pair of opposite spaced apart upper ends 82 and a lower end 84 located between the upper ends. Each leaf spring assembly 76, which can be composed of one or more individual leaf springs, has a hole 86 defined in its center lower end 84 by which it is attached by a bolt 88 to the lower adapter plate 44 adjacent one corner 60 of an opposite pair of the peripheral corners 60 of the adapter plate. Each assembly 76 is movably coupled at its upper ends 82 to the guide grooves 78 on the upper hold-down plate 42 adjacent both of the peripheral corners 58 thereon being located on either side of the one corner 60 on the adapter plate 44 to which the assembly's lower end 84 is attached.

Figure 7:
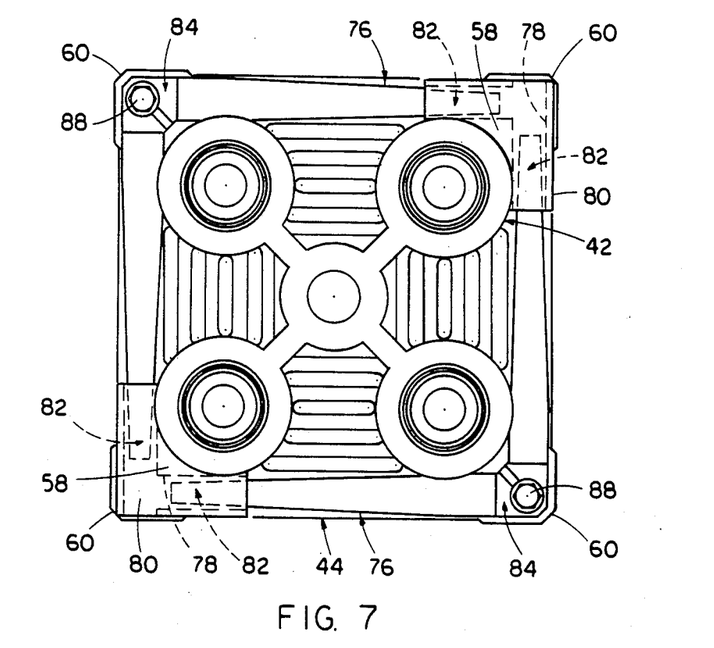
FIG. 7 is an enlarged top plan view of the improved top nozzle similar to FIG. 2, but showing an alternative arrangement of the leaf springs employed by the top nozzle.
Figure 8:
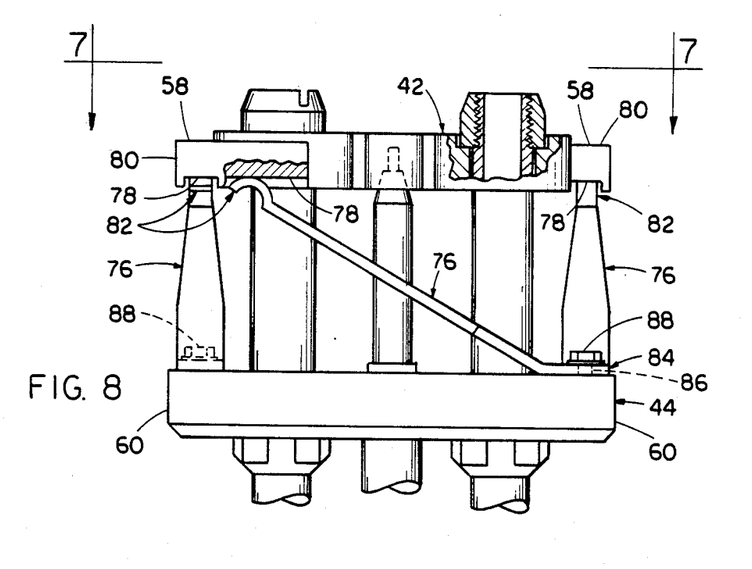
FIG. 8 is an enlarged elevational view, with a portion broken away and sectioned, of the improved top nozzle similar to FIG. 3, but showing the alternative arrangement of the leaf springs depicted in FIG. 6.
Figure 9:
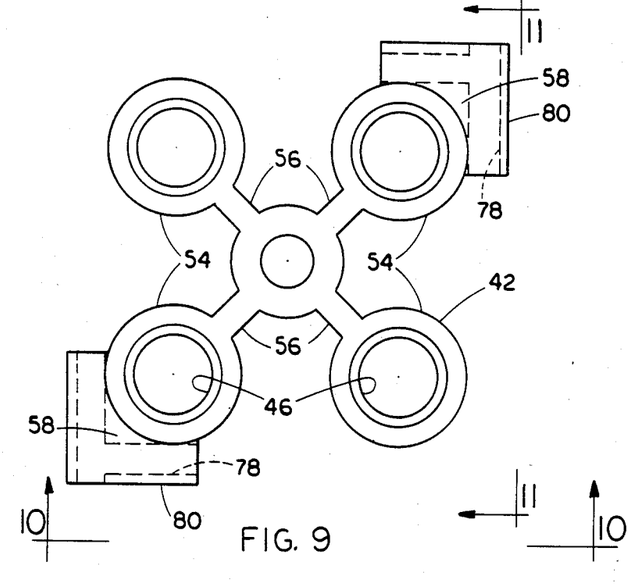
FIG. 9 is a top plan view of the upper hold-down plate removed from the improved top nozzle of FIG. 7.
Figure 10:
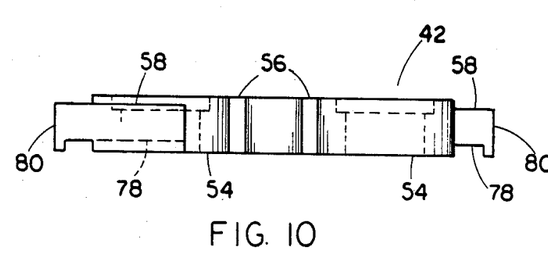
FIG. 10 is an elevational view of the upper hold-down plate as taken along line 10—10 of FIG. 9.
Figure 11:
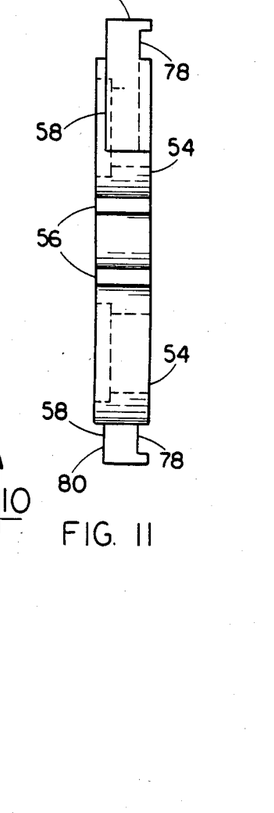
FIG. 11 is another elevational view of the upper hold-down plate as taken along line 11—11 of FIG. 9.

This alternative arrangement of the leaf spring assemblies 76 is more symmetrical in configuration than the preferred arrangement of assemblies 38. However, it engages the upper and lower plates 42,44 at only two of four diametrically opposite corners, whereas the alternative arrangement engages the plates at each of the four corners.

FIGS. 12A and 12B are diagrammatic representations of two fuel assemblies 90 and 20 having the same overall axial height. However, the fuel assembly 20 of FIG. 12B having the improved top nozzle with the preferred arrangement of leaf springs 38 of the present invention has fuel rods 28 with greater height as compared with the height of the fuel rods 92 in the assembly 90 of FIG. 12A having the prior art top nozzle with coil springs 94. The difference is due to the fact that the prior art coil springs 94 require greater axial height than that of the leaf springs 38 in order to deliver the same hold-down force.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the forms hereinbefore described being merely exemplary embodiments thereof.

We claim:

1. In a fuel assembly including a top nozzle and a plurality of guide thimbles having upper end portions mounting said top nozzle, said top nozzle having an upper hold-down plate and a lower adapter plate, said upper end portions of said guide thimbles extending through and stationarily mounting said lower adapter plate and extending through and slidably mounting said upper hold-down plate for relative movement along said guide thimble upper end portions toward and away from said lower adapter plate, said top nozzle further having means which defines an upper limit of relative movement of said hold-down plate along said guide thimble upper end portions away from said lower adapter plate, the improvement incorporated by said top nozzle which comprises:
   (a) a plurality of leaf spring assemblies interposed between said upper hold-down plate and said lower adapter plate so as to yieldably support said movable upper hold-down plate in spaced relation above said stationary lower adapter plate;
   (b) said leaf spring assemblies being arranged along opposing peripheries of said upper hold-down plate and lower adapter plate and engaged with said upper and lower plates at predetermined locations on said respective peripheries thereof so as to bias said upper hold-down plate in an upward direction and thereby impose a hold-down force on said fuel assembly via said lower adapter plate which tends to displace said upper hold-down plate to its upper limit along said guide thimble upper end portions away from said lower adapter plate, each of said leaf spring assemblies including opposite lower and upper ends, said each leaf spring assembly being attached at its lower end to said lower adapter plate at one of said predetermined locations on said periphery thereof and being movably coupled at its upper end to said upper hold-down plate at one of said predetermined locations on said periphery thereof; and
   (c) a plurality of guide means defined in said upper hold-down plate at said predetermined locations on said periphery thereof with which are movably coupled said respective upper ends of said leaf spring assemblies, each of said guide means being in the form of a groove defined at one of said predetermined locations in an underside of said upper hold-down plate.

2. The improved top nozzle as recited in claim 1, wherein said each leaf spring assembly includes at least one leaf spring therein.

3. The improved top nozzle as recited in claim 1, wherein said each leaf spring assembly includes more than one leaf spring therein.

4. The improved top nozzle as recited in claim 1 wherein:
   each of said upper hold-down plate and lower adapter plate has a plurality of opposite corners on said respective peripheries thereof which are vertically aligned with one another; and
   said each leaf spring assembly is attached at its lower end to said lower adapter plate periphery, and is movably coupled at its upper end to said upper hold-down plate adjacent a next one of said corners on said hold-down plate periphery.

5. The improved top nozzle as recited in claim 4, wherein said leaf spring assemblies are arranged in a single file about said peripheries of said lower adapter plate and upper hold-down plate, said upper end of each leaf spring assembly being movably coupled adjacent one of said corners of said upper hold-down plate and overlying said lower end of the next succeeding leaf spring assembly in said single file thereof being attached adjacent the one of said corners of said lower adapter plate which is aligned below said one corner of said upper hold-down plate.

6. The improved top nozzle as recited in claim 5, wherein said single file of leaf spring assemblies includes one leaf spring assembly extending between each pair of succeeding corners in said aligned pluralities thereof on said respective peripheries of said lower adapter plate and upper hold-down plate.

7. In a fuel assembly including a top nozzle and a plurality of guide thimbles having upper end portions mounting said top nozzle, said top nozzle having an upper hold-down plate and a lower adapter plate, said upper hold-down plate and lower adapter plate each having a plurality of corners on respective peripheries thereof being opposite to and vertically aligned with one another, said upper end portions of said guide thimbles extending through and stationarily mounting said lower adapter plate and extending through and slidably mounting said upper hold-down plate for relative movement along said guide thimble upper end portions toward and away from said lower adapter plate, said top nozzle further having means which defines an upper limit of relative movement of said hold-down plate along said guide thimble upper end portions away from said lower adapter plate, the improvement incorporated by said top nozzle which comprises:

(a) a plurality of leaf spring assemblies interposed between said upper hold-down plate and said lower adapter plate so as to yieldably support said movable upper hold-down plate in a spaced relation above said stationary lower adapter plate;

(b) said leaf spring assemblies being arranged along said respective peripheries of said upper hold-down plate and lower adapter plate and engaged with said upper and lower plates adjacent predetermined ones of said corners on said respective peripheries thereof so as to bias said upper hold-down plate in an upward direction and thereby impose a hold-down force on said fuel assembly via said lower adapter plate which tends to displace said upper hold-down plate to its upper limit along said guide thimble upper end portions away from said lower adapter plate;

(c) said each leaf spring assembly including opposite lower and upper ends, said each leaf spring assembly being attached at its lower end to said lower adapter plate adjacent one of said corners on said adapter plate periphery and being movably coupled at its upper end to said upper hold-down plate adjacent a next one of said corners on said hold-down plate periphery; and (d) said upper hold-down plate having a plurality of guide means defined therein adjacent said predetermined ones of said corners on said periphery thereof within which are movably coupled said respective upper ends of said leaf spring assemblies, said guide means being in the form of a groove defined in the underside of said upper hold-down plate periphery;

(f) said single file of leaf spring assemblies including one leaf spring assembly extending between each pair of succeeding corners in said aligned pluralities thereof on said respective peripheries of said lower adapter plate and upper hold-down plate.

8. In a fuel assembly including a top nozzle and a plurality of guide thimbles having upper end portions mounting said top nozzle, said top nozzle having an upper hold-down plate and a lower adapter plate, said upper end portions of said guide thimbles extending through and stationarily mounting said lower adapter plate and extending through and slidably mounting said upper hold-down plate for relative movement along said guide thimble upper end portions toward and away from said lower adapter plate, said top nozzle further having means which defines an upper limit of relative movement of said hold-down plate along said guide thimble upper end portions away from said lower adapter plate, the improvement incorporated by said top nozzle which comprises:

(a) a plurality of leaf spring assemblies interposed between said upper hold-down plate and said lower adapter plate so as to yieldably support said movable upper hold-down plate in a spaced relation above said stationary lower adapter plate; and (b) a plurality of guide means defined in said hold-down plate at said predetermined locations on said periphery thereof within which are movably coupled said respective upper ends of said leaf spring assemblies, each of said guide means is in the form of a groove defined at one of said predetermined locations in an underside of said upper hold-down plate;

(c) said leaf spring assemblies being arranged along opposing peripheries of said upper hold-down plate and lower adapter plate and engaged with said upper and lower plates at predetermined locations on said respective peripheries thereof so as to bias said upper hold-down plate in an upward direction and thereby impose a hold-down force on said fuel assembly via said lower adapter plate which tends to displace said upper hold-down plate to its upper limit along said guide thimble upper end portions away from said lower adapter plate, each of said leaf spring assemblies includes opposite spaced apart upper ends and a lower end located between said upper ends, said each leaf spring assembly being attached at its lower end to said lower adapter plate at one of said predetermined locations on said periphery thereof and being movably coupled at each of its upper ends to said upper hold-down plate at one of said predetermined locations on said periphery thereof.

9. In a fuel assembly including a top nozzle and a plurality of guide thimbles having upper end portions mounting said top nozzle, said top nozzle having an upper hold-down plate and a lower adapter plate, said upper end portions of said guide thimbles extending through and stationarily mounting said lower adapter plate and extending through and slidably mounting said upper hold-down plate for relative movement along said guide thimble upper end portions toward and away from said lower adapter plate, said top nozzle further having means which defines an upper limit of relative movement of said hold-down plate along said guide thimble upper end portions away from said lower adapter plate, the improvement incorporated by said top nozzle which comprises:

(a) a plurality of leaf spring assemblies interposed between said upper hold-down plate and said lower adapter plate so as to yieldably support said movable upper hold-down plate in a spaced relation above said stationary lower adapter plate;

(b) said upper hold-down plate and lower adapter plate each has a plurality of corners on respective peripheries thereof which are opposite to and vertically aligned with one another;

(c) said leaf spring assemblies being arranged along opposing peripheries of said upper hold-down plate and lower adapter plate and engaged with said upper and lower plates at predetermined locations on said respective peripheries thereof so as to bias said upper hold-down plate in an upward direction and thereby impose a downward force on said fuel assembly via said lower adapter plate to its upper limit along said guide thimble upper end portions away from said lower adapter plate;

(d) each leaf spring assembly including opposite spaced apart upper ends and a lower end located between said upper ends, being attached at its lower end to said adapter plate adjacent one corner of an opposite pair of said corners on said adapter plate periphery and being movably coupled at its upper ends to said upper hold-down plate adjacent both corners on said hold-down plate periphery being located on either side of said one corner on said adapter plate; and (e) a plurality of guide means in the form of grooves defined on said upper hold-down plate adjacent said corners on said periphery thereof within which are movably coupled said respective upper ends of said leaf spring assemblies.

10. The improved top nozzle as recited in claim 9, wherein said each leaf spring assembly has a generally L-shaped configuration.

11. The improved top nozzle as recited in claim 9, wherein said each leaf spring assembly includes at least one leaf spring therein.

12. The improved top nozzle as recited in claim 9, wherein said each leaf spring assembly includes more than one leaf spring in a stacked relation therein.

13. In a fuel assembly including a top nozzle and a plurality of guide thimbles having upper end portions mounting said top nozzle, said top nozzle having an upper hold-down plate and a lower adapter plate, said upper hold-down plate and lower adapter plate each having a plurality of corners on respective peripheries thereof being opposite to and vertically aligned with one another, said upper end portions of said guide thimbles extending through and stationarily mounting said lower adapter plate and extending through and slidably mounting said upper hold-down plate for relative movement along said guide thimble upper end portions toward and away from said lower adapter plate, said top nozzle further having means which defines an upper limit of relative movement of said hold-down plate along said guide thimble upper end portions away from said lower adapter plate, the improvement incorporated by said top nozzle which comprises:

(a) a pair of leaf spring assemblies interposed between said upper hold-down plate and said lower adapter plate so as to yieldably support said movable upper hold-down plate in a spaced relation above said stationary lower adapter plate;

(b) said leaf spring assemblies being arranged along said respective peripheries of said upper hold-down plate and lower adapter plate and engaged with said upper and lower plates adjacent predetermined ones of said corners on said respective peripheries thereof so as to bias said upper hold-down plate in an upward direction and thereby impose a hold-down force on said fuel assembly via said lower adapter plate which tends to displace said upper hold-down plate to its upper limit along said guide thimble upper end portions away from said lower adapter plate; and (c) said upper hold-down plate having a plurality pf guide means defined therein adjacent said predetermined ones of said corners on said periphery thereof within which are movably coupled said respective upper ends of said leaf spring assemblies, each of said guide means being in the form of a groove defined in the underside of said periphery of said corner;

(d) said each leaf spring assembly including opposite spaced apart upper ends and a lower end located between said upper ends, said each leaf spring assembly being attached at its lower end to said lower adapter plate adjacent one corner of an opposite pair of said corners on said adapter plate periphery and being movably coupled at its upper ends to said guide means on said upper hold-down plate periphery being located on either side of said one corner on said adapter plate.

* * * * *